US010257192B2

(12) United States Patent
Shin et al.

(10) Patent No.: US 10,257,192 B2
(45) Date of Patent: Apr. 9, 2019

(54) STORAGE SYSTEM AND METHOD FOR PERFORMING SECURE WRITE PROTECT THEREOF

(71) Applicant: Samsung Electronics Co., Ltd., Suwon-si, Gyeonggi-do (KR)

(72) Inventors: Bo-Ram Shin, Suwon-si (KR); Jaegyu Lee, Suwon-si (KR); HeeChang Cho, Seoul (KR); Wonchul Ju, Seoul (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 184 days.

(21) Appl. No.: 14/710,934

(22) Filed: May 13, 2015

(65) Prior Publication Data

US 2015/0350206 A1 Dec. 3, 2015

Related U.S. Application Data

(60) Provisional application No. 62/004,344, filed on May 29, 2014.

(30) Foreign Application Priority Data

Mar. 13, 2015 (KR) .................. 10-2015-0035052

(51) Int. Cl.
*G06F 12/14* (2006.01)
*G06F 21/60* (2013.01)
(Continued)

(52) U.S. Cl.
CPC ...... *H04L 63/0876* (2013.01); *G06F 12/1408* (2013.01); *G06F 21/78* (2013.01);
(Continued)

(58) Field of Classification Search
CPC ...... G06F 21/78; G06F 21/79; G06F 12/0246; G06F 12/1408; G06F 3/0679;
(Continued)

(56) References Cited

U.S. PATENT DOCUMENTS 5,375,243 A * 12/1994 Parzych .................. G06F 21/34
380/52
6,724,554 B1 * 4/2004 Braithwaite ........... G11B 19/04
360/60

(Continued)

OTHER PUBLICATIONS

JEDEC. "Embedded Multi-media Card (eMMC) Electrical Standard (5.0)", pp. 18-83. <http://www.jedec.org>. Sep. 2013.*

(Continued)

*Primary Examiner* — Michael Simitoski
(74) *Attorney, Agent, or Firm* — Harness, Dickey & Pierce, P.L.C.

(57) ABSTRACT

A storage system includes a host configured to provide a request for setting or clearing secure write protection; and a storage device including a register, the register including fields that store information for controlling write protection attributes and a secure mode of the storage device, the storage device being configured to authenticate a request of the host when the secure mode is enabled, wherein the storage device is configured set or clear the secure write protection based on the request of the host when the storage device authenticates the request of the host, wherein after the secure mode is set, the storage device restricts an access of an unauthenticated host for setting and clearing write protection, and wherein the register comprises a secure write protection (WP) configuration masking field for controlling register fields of the register that are associated with write protection.

18 Claims, 17 Drawing Sheets

(51) Int. Cl.
  *H04L 29/06* (2006.01)
  *G06F 21/78* (2013.01)
  *H04L 9/32* (2006.01)

(52) U.S. Cl.
  CPC ............... *G06F 2212/1052* (2013.01); *G06F 2221/2141* (2013.01)

(58) Field of Classification Search
  CPC ..... G06F 2212/1052; G06F 2212/2141; H01L 21/8221; H04L 63/0876
  See application file for complete search history.

(56) References Cited

U.S. PATENT DOCUMENTS

| | | | |
|---|---|---|---|
| 7,523,281 B2* | 4/2009 | Madathilparambil George | G06F 21/80 711/154 |
| 7,679,133 B2 | 3/2010 | Son et al. | |
| 8,391,489 B2 | 3/2013 | Paksoy et al. | |
| 8,452,934 B2* | 5/2013 | Jogand-Coulomb | G06F 13/4243 711/102 |
| 8,478,963 B2 | 7/2013 | Chang | |
| 8,528,046 B2 | 9/2013 | Lambert et al. | |
| 8,553,466 B2 | 10/2013 | Han et al. | |
| 8,559,235 B2 | 10/2013 | Yoon et al. | |
| 8,595,418 B2 | 11/2013 | Lee | |
| 8,654,587 B2 | 2/2014 | Yoon et al. | |
| 8,706,957 B2 | 4/2014 | Caraccio et al. | |
| 2006/0112246 A1* | 5/2006 | Boning | G06F 12/1483 711/163 |
| 2006/0288180 A1* | 12/2006 | Shih | G06F 12/1458 711/163 |
| 2008/0059742 A1* | 3/2008 | George | G06F 21/80 711/163 |
| 2008/0250509 A1* | 10/2008 | Ahvenainen | G06F 12/1441 726/34 |
| 2009/0089526 A1* | 4/2009 | Kuo | G06F 21/79 711/163 |
| 2010/0017558 A1* | 1/2010 | Fruin | G06F 3/0607 711/103 |
| 2010/0042782 A1* | 2/2010 | Grynberg | G06F 12/1433 711/115 |
| 2011/0162082 A1 | 6/2011 | Paksoy et al. | |
| 2011/0233648 A1 | 9/2011 | Seol et al. | |
| 2011/0264882 A1* | 10/2011 | Scott | G06F 12/1425 711/163 |
| 2012/0036313 A1 | 2/2012 | Ito et al. | |
| 2013/0014269 A1 | 1/2013 | Chang et al. | |
| 2013/0159727 A1* | 6/2013 | Sarangdhar | G06F 12/1408 713/189 |
| 2013/0268778 A1 | 10/2013 | Maeda et al. | |
| 2013/0290740 A1* | 10/2013 | Ziarnik | G06F 9/4411 713/300 |
| 2014/0095853 A1 | 4/2014 | Sarangshar | |
| 2014/0223198 A1* | 8/2014 | Saranghar | G06F 13/14 713/193 |
| 2015/0154112 A1* | 6/2015 | Tuers | G06F 12/0246 714/773 |
| 2015/0161399 A1* | 6/2015 | Mylly | G06F 21/79 726/30 |
| 2015/0286585 A1* | 10/2015 | Caraccio | G06F 12/1458 713/189 |
| 2016/0062917 A1* | 3/2016 | Mylly | G06F 9/4403 711/163 |

OTHER PUBLICATIONS

Embedded MultiMediaCard(e•MMC) e•MMC/Card Product Standard, High Capacity, including Reliable Write, Boot, Sleep Modes, Dual Data Rate, Multiple Partitions Supports, Security Enhancement, Background Operation and High Priority Interrupt (MMCA, 4.41), JEDEC Standard No. 84-A441, Mar. 2010, 234 pages.

* cited by examiner

FIG. 4

| Bit 7 | Bit 6 | Bit 5 | Bit 4 | Bit 3 | Bit 2 | Bit 1 | Bit 0 |
|---|---|---|---|---|---|---|---|
| PERM_PSWD_DIS | CD_PERM_WP_DIS | Reserved | US_PERM_WP_DIS | US_PWR_WP_DIS | US_PERM_WP_EN | Reserved | US_PWR_WP_EN |
| R/W | R/W | | R/W | R/W/C_P | R/W/E_P | | R/W/E_P |

FIG. 7

| Start | Stuff Bytes | Key/ (MAC) | Data | Nonce | Write Counter | Address | Block Counter | Result | Req/ Resp | CRC16 |
|---|---|---|---|---|---|---|---|---|---|---|
| 1bit | 196byte | 32Byte (256b) | 256Byte | 16Byte | 4Byte | 2Byte | 2Byte | 2Byte | 2Byte | 2Byte |
| | [511:316] | [315:284] | [283:28] | [27:12] | [11:8] | [7:6] | [5:4] | [3:2] | [1:0] | |

STORAGE SYSTEM AND METHOD FOR PERFORMING SECURE WRITE PROTECT THEREOF

CROSS-REFERENCE TO RELATED APPLICATIONS

A claim for priority under 35 U.S.C. § 119 is made to the U.S. Patent Provisional Application No. 62/004,344 filed May 29, 2014, the U.S. Patent and Trademark Office, and Korean Patent Application No. 10-2015-0035052 filed Mar. 13, 2015, in the Korean Intellectual Property Office, the entire contents of each of which are incorporated herein by reference.

BACKGROUND

Embodiments of the inventive concepts described herein relate to a storage system, and more particularly, relate to a storage system and a secure write protect performing method thereof.

A storage system includes a host and a storage device. The host and the storage device are connected through a variety of standardized interfaces, such as a Serial ATA (SATA), Universal Flash Storage (UFS), a Small Computer Small Interface (SCSI), a Serial Attached SCSI (SAS), and an embedded MultiMediaCard (eMMC).

In a conventional storage device, a host may permit anyone to set or clear write protection using a command without restriction. That is, even though the write protection is set, there may be no restrictions on the entities (e.g., hosts) that are allowed to clear the write protect or may change a configuration of the write protection. For example, a boot loader or a kernel image may be write-protected in an Android system of a mobile device. However, since anyone clears the writ-protect and changes its configuration, probability that a system is exposed to an unacceptable change such as rooting may exist.

SUMMARY

Embodiments of the inventive concepts provide a storage system permitting only a certified host to set or clear write protect or to change an attribute of the write protect through an authentication procedure of a storage device by setting of a secure mode, with a conventional write protect setting and clearing manner maintained without change. According to at least one example embodiment of the inventive concepts, a storage system may include a host configured to provide a request for setting or clearing secure write protection; and a storage device including a register, the register including fields that store information for controlling write protection attributes and a secure mode of the storage device, the storage device being configured to authenticate a request of the host when the secure mode is enabled, wherein the storage device is configured set or clear the secure write protection based on the request of the host when the storage device authenticates the request of the host, wherein after the secure mode is set, the storage device restricts an access of an unauthenticated host for setting and clearing write protection, and wherein the register comprises a secure write protection (WP) configuration masking field for controlling register fields of the register that are associated with write protection.

The register may include a secure WP support field configured to control whether or not the storage device supports the secure WP.

The register may include a secure WP enable field configured to control a state of the secure mode of the storage device.

The host may be configured to set the secure WP enable field through authentication using at least one of keyed-hash message authentication code (HMAC), SHA256, or MD5.

The register may include a secure WP configuration masking field for controlling register fields associated with the WP, and register fields associated with the write protection may be controlled by the secure WP configuration masking field.

The storage device may be configured such that a number of register fields controlled by the secure WP configuration masking field is greater than a number of bits included in the WP configuration masking field.

The storage system may be configured such that storage device requires requests of the host to be authenticated using at least one of keyed-hash message authentication code (HMAC), SHA256, or MD5 before the storage device allows the host to access the secure WP configuration masking field through.

The storage system may be configured such that storage device requires requests of the host to set or clear the secure WP to be authenticated using at least one of keyed-hash message authentication code (HMAC), SHA256, or MD5 before the storage device allows the host to set or clear the secure WP.

The host may be configured such that the request of the host to set or clear the secure WP is provided using a data frame that includes a request/response type field, a write counter field, a nonce field, a block counter field, a data field, an address field, a result field, and an HMAC field.

The storage device may be an embedded MultiMediaCard (eMMC) and is configured to implement the secure write protection using a replay protected memory block (RPMP).

The storage system may be configured to prevent a power management integrated circuit (PMIC)-based security attack through automatic power-on recovery.

The storage device may include at least one of a plurality of flash memory devices, the plurality of flash memory devices each including a three-dimensional memory array.

According to at least one example embodiment of the inventive concepts, a storage system may include a storage device, the storage device being configured to implement a write protection (WP) mode such that, when the WP mode is in an enabled state, the storage device prevents data stored in the storage device from being changed until the WP mode is in a disabled state, the storage device being configured to receive a WP change request, the WP change request being a request to change a state of the WP mode, the storage device being configured to implement a secure mode such that, when the secure mode is in an disabled state, the storage device changes the state of the WP mode in response to the WP change request, and when the secure mode is in an enabled state, the storage device performs an authentication process on the WP change request, and the storage device does not change the state of the WP mode in response to the WP change request only unless the authentication process indicates that the WP change request is valid.

The storage system of claim may further include a host, the host being configured to generate the WP change request such that the WP change request include an authentication code, and to send the WP change request to the storage device, the storage device being configured such that, when the secure mode is enabled, the storage device performs the authentication process on the WP change request based on the authentication code.

The host may be configured such that the authentication code is a keyed-hash message authentication code (HMAC).

The host may be configured to generate the authentication code using a shared private key copies of which are stored at both the host and the storage device.

The storage device may be configured such that performing the authentication process includes, generating a validation code using the shared private key, performing a comparison operation based on the validation code and the authentication code, and determining whether the WP change request is valid based on a result of the comparison operation.

The host may be configured such that the authentication code is a keyed-hash message authentication code (HMAC), and the storage device is configured such that the validation code is a HMAC.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIG. 4 is a table schematically illustrating user area write protect of a modes segment of an EXT_CSD register;

FIG. 7 is a table schematically illustrating a data frame including information regarding requests and responses for setting and clearing secure write protect;

DETAILED DESCRIPTION

Figure 1:
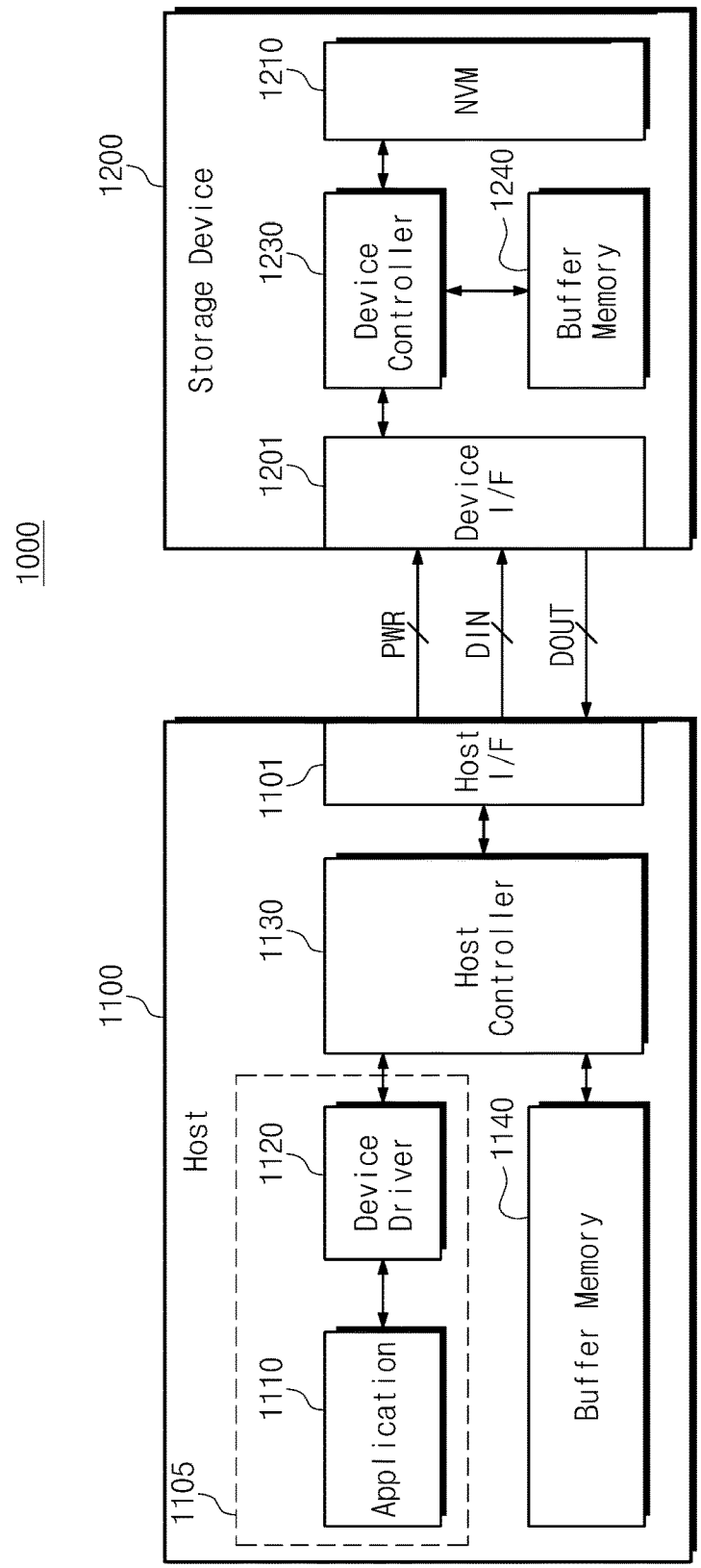
FIG. 1 is a block diagram schematically illustrating a storage system.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a block diagram schematically illustrating a storage system. Referring to FIG. 1, a storage system 1000 may contain a host 1100 and a storage device 1200. The host 1100 and the storage device 1200 may be connected through a variety of standardized interfaces, such as a Serial ATA (SATA), Universal Flash Storage (UFS), a Small Computer Small Interface (SCSI), a Serial Attached SCSI (SAS), and an embedded MultiMediaCard (eMMC).

As illustrated in FIG. 1, a host interface 1101 and a device interface 1201 may be connected through data lines DIN and DOUT for exchanging data or signals and a power line PWR for providing power. The host 1100 may include a processor 1105, a host controller 1130, and a buffer memory 1140.

The processor 1105 may execute an application 1110 and a device driver 1120. The application 1110 may be a variety of application programs to be executed on the host 1100. The device driver 1120 may be used to drive peripheral devices connected with the host 1100 for use. In FIG. 1, the device driver 1120 may drive the storage device 1200.

The term 'processor', as used herein, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multiprocessor, an application-specific integrated circuit (ASIC), and a field programmable gate array (FPGA).

The application 1110 or the device driver 1120 may be implemented by software or firmware. The host controller 1130 may provide data to the storage device 1200 through the host interface 1101 or may receive data from the storage device 1200 through the host interface 1101.

Not only is the buffer memory 1140 used as a main memory or a cache memory of the host 1100, but it is also used as a driving memory for driving software, such as the application 1110 or the device driver 1120, etc.

The storage device 1200 may be connected to the host 1100 through the device interface 1201. The storage device 1200 may include a nonvolatile memory 1210, a device controller 1230, and a buffer memory 1240. The nonvolatile memory 1210 may include the following: flash memory, MRAM, PRAM, and FeRAM. The device controller 1230 may control an overall operation of the nonvolatile memory 1210 including a write operation, a read operation, an erase operation, etc. The device controller 1230 may exchange data with the nonvolatile memory 1210 or the buffer memory 1240 through an address or data bus.

The buffer memory 1240 may be used to temporarily store data to be stored at the nonvolatile memory 1210 or data read from the nonvolatile memory 1210. The buffer memory 1240 may be implemented with a volatile memory or a nonvolatile memory.

The storage system 1000 shown in FIG. 1 may be applied to a flash memory based mobile device or any other electronic device. Below, a configuration or an operating method of the storage system 1000 shown in FIG. 1 will be more fully described.

Figure 2:
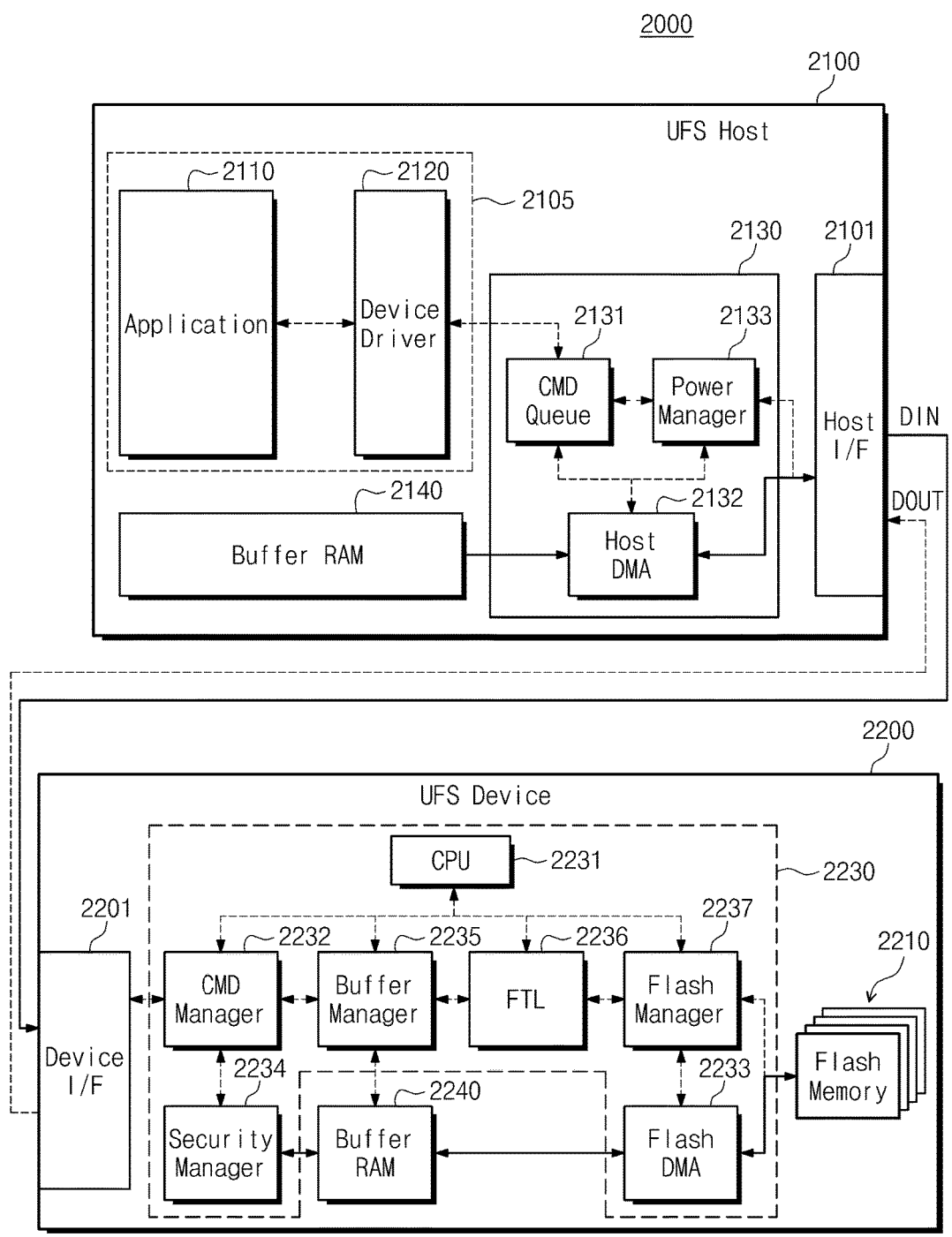
FIG. 2 is a block diagram schematically illustrating a flash memory-based storage system.

FIG. 2 is a block diagram schematically illustrating a flash memory-based storage system. Referring to FIG. 2, a storage system 2000 may include a host 2100 and a storage device 2200. The storage device 2200 shown in FIG. 2 may be, for example, an eMMC.

The host 2100 may include a processor 2105, a host controller 2130, and a buffer RAM 2140. The processor 2105 may execute an application 2110 and a device driver 2120. The host controller 2130 may include a command queue 2131, a host DMA 2132, and a power manager 2133. The host controller 2130 may be implemented, for example, as a circuit capable of executing code. Further, the command queue 2131, host DMA 2132, and power manager 2133 may be algorithm, software, or firmware that is executed by the host controller 2130.

Commands (e.g., a write command) generated by the processor 2105, that is, the application 2110 and the device driver 2120 in the host 2100 may be provided to the command queue 2131 of the host controller 2130. The command queue 2131 may sequentially store commands to be provided to the storage device 2200. Provided to the host DMA 2132 are the commands that are stored in the command queue 2131. The host DMA 2132 may send the commands to the storage device 2200 through a host interface 2101.

As shown in FIG. 2, the storage device 2200 may contain a flash memory 2210, a device controller 2230, and a buffer RAM 2240. The device controller 2230 may include a Central Processing Unit (CPU) 2231, a command manger 2232, a flash DMA 2233, a security manager 2234, a buffer manager 2235, a flash translation layer (FTL) 2236, and a flash manager 2237. Herein, the command manager 2232, security manager 2234, buffer manager 2235, FTL 2236, and flash manager 2237 may be implemented by algorithm, software, or firmware that is driven on the device controller 2230, for example, by being executed by the CPU 2231.

A command transferred from the host 2100 to the storage device 2200 may be provided to the command manager 2232 through the device interface 2201. The command manager 2232 may analyze a command provided from the host 2100, and it may authenticate the command by means of the security manager 2234. The command manager 2232 may allocate the buffer RAM 2240 so as to receive data through the buffer manager 2235. If the command manger 2232 determines the storage device 2200 is ready to transfer data, the command manager 2232 may send a ready-to-transfer complete signal to the host 2100.

The host 2100 may send data to the storage device 2200 in response to the ready-to-transfer complete signal. The data may be sent to the storage device 2200 through the host DMA 2132 and the host interface 2101. The storage device 2200 may store the received data in the buffer RAM 2240 through the buffer manager 2235. The data stored in the buffer RAM 2240 may be provided to the flash manger 2237 through the flash DMA 2233. The flash manager 2237 may store data at a selected address of the flash memory 2210, based on address mapping information of the FTL 2236.

If a data transfer operation for a command and a program operation are completed, then the storage device 2200 may send a response signal to the host 2100 through an interface and may inform the host 2100 of command completion. The host 2100 may inform the device driver 2120 and the application 2110 of whether a command corresponding to the response signal is processed and then may terminate an operation on the command.

When the storage system 2000 shown in FIG. 2 is applied to a user device or a mobile device, it is very important to clear or set write protect for data reliability and security.

The storage system 2000 according to at least one example embodiment of the inventive concepts may allow only a certified host with a private key to set or clear write protect through setting of a secure mode using secure authentication such as keyed-hash message authentication code (HMAC). Examples of HMAC include SHA256, MD5, etc. At least one example embodiment of the inventive concepts may solve a security problem characterized by anyone being able to change data, by maintaining compatibility with a conventional mobile product and granting access rights with respect to a register field associated with setting and clearing of write protect through authentication.

Setting, clearing, and changing attributes of write protection of a storage system according to at least one example embodiment of the inventive concepts will be more fully described with reference to a storage system 2000 illustrated in FIG. 2.

Figure 3:
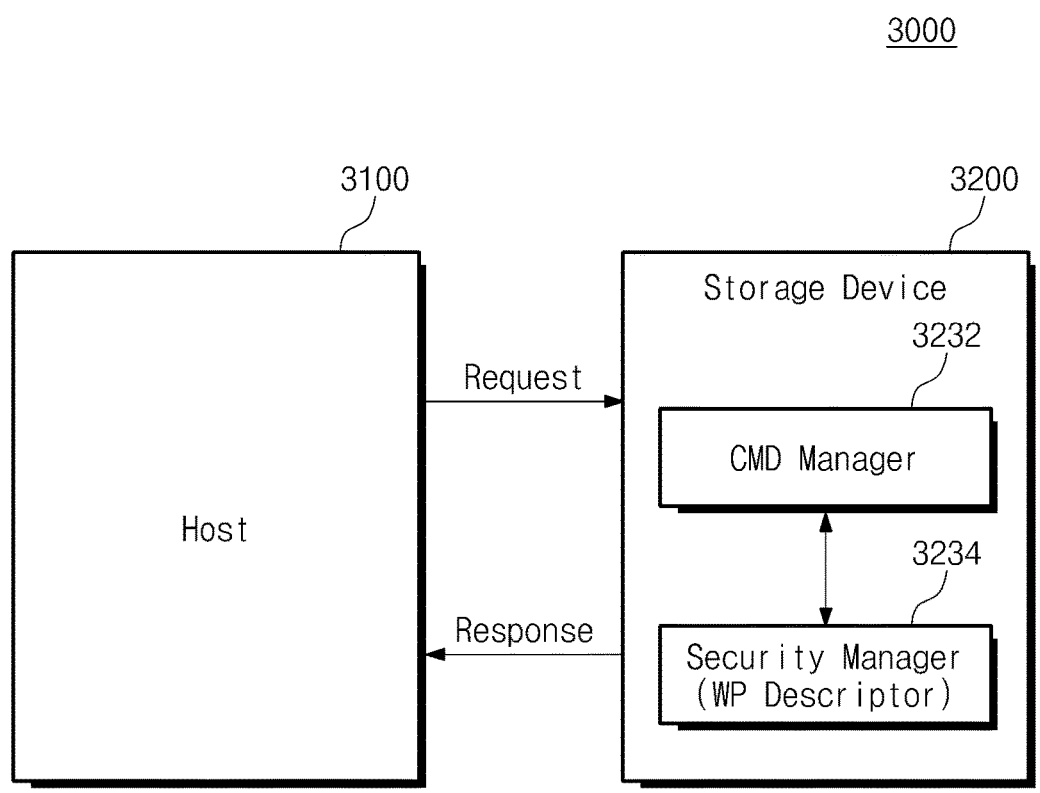
FIG. 3 is a block diagram schematically illustrating a storage system according to at least one example embodiment of the inventive concepts.

FIG. 3 is a block diagram schematically illustrating a storage system according to at least one example embodiment of the inventive concepts. Referring to FIG. 3, a storage system 3000 may contain a host 3100 and a storage device 3200. The storage device 3200 may include a command manager 3232 and a security manager 3234. The security manager 3234 may manage a device register.

The device register may be stored at a nonvolatile memory such as a flash memory 2210 (refer to FIG. 2) or a ROM, etc. and may be loaded on a driving memory, such as a DRAM, etc., at power-on. The device register may be used to set or clear write protection or to change an attribute of the write protection. As used herein, the term write protection may be may be referred to as "write protect" or "WP", and refers to a state of a storage device in which the storage device prevents data stored in the storage device from being changed, or one or more functions related to such a state. As used herein, the terms "secure mode" and "secure WP" (or "secure write protection", or "secure write protect") refer to a mode of a storage device where authentication is required for a host to be able to change a write protection state of the storage device. Accordingly, hosts whose requests cannot be authenticated by a storage device are unable to change a state of (e.g., disable or enable) write protection for the storage device if the secure mode is enabled for the storage device. In an eMMC, the device register may be formed of six registers: an Operation Conditions Register (OCR), a Device Identification (CID) register, a Device Specific Data (CSD) register, an extended CSD (EXT_CSD) register, a Relative Device Address (RCA) register, and a Driver Stage Register (DSR).

The OCR register may be formed of 32 bits and may store a Vdd voltage profile and access mode indication of the storage device 3200. The CID register may be formed of 128 bits and may store device identification information. The CSD register may provide information about how to access device contents.

The CSD register may define a data format, an error correction type, a maximum data access type, a data transfer speed, etc. The RCA register may be formed of 16 writable bits and may fetch a device address allocated by a host during a device identification section. The DSR may be formed of 16 bits and may be used to improve bus performance for extended operating conditions.

The EXT_CSD register may be formed of 512 bytes and may define device properties and selected modes. 320 upper bytes may be a properties segment, and 192 lower bytes may be a modes segment. A mode may be changed by a host through a SWITCH mode.

FIG. 4 is a table schematically illustrating user area write protect USER_WP of a modes segment of an EXT_CSD register. Referring to FIG. 4, user area write protect USER_WP may be formed of one byte (i.e., 8 bits). The following table 1 illustrates an attribute of the user area write protect USER_WP.

TABLE 1

Bit[7]: PERM_PSWD_DIS (R/W)
    0x0:  Password protection features are enabled.
    0x1:  Password protection features (ERASE (Forcing erase) LOCK UNLOCK CLR_PWD,
           SET_PWD) are disabled permanently.
Bit[6]: CD_PERM_WP_DIS (R/W)
    0x0: Host is permitted to set PERM_WP_PROTECT (CSD[13])
    0x1: Disable the use of PERM_WP_PROTECT (CSD[13])
Bit[5]: Reserved
Bit[4]: US_PERM_WP_DIS (R/W)
    0x0:  Permanent write protection can be applied to write protection groups.
    0x1:  Permanently disable the use of permanent write protection for write protection groups
          within all the partitions in the user area from the point this bit is set forward. Setting this
          bit does not impact areas that are already protected.
Bit[3]: US_PWR_WP_DIS (R/W/C_P)
    0x0:  Power-on write protection can be applied to write protection groups.
    0x1:  Disable the use of power-on period write protection for write protection groups within all TABLE 1-continued the partitions in the user area from the point this bit is set until power is removed or a
hardware reset occurs. Setting this bit does not impact areas that are already protected.

Bit[2]: US_PERM_WP_EN (R/W/E_P)
    0x0: Permanent write protection is not applied when CMD28 is issued.
    0x1: Apply permanent write protection to the protection group indicated by CMD28. This bit
          cannot be set if US_PERM_WP_DIS is set Bit[1]: Reserved Bit[0]: US_PWR_WP_EN (R/W/E_P)
    0x0: Power-on write protection is not applied when CMD28 is issued.
    0x1: Apply Power-On Period protection to the protection group indicated by CMD28. This bit
          cannot be set if US_PWR_WP_DIS is set. This bit has not impact if US_PERM_WP_EN
          is set.

A USER_WP field may be placed at an address [171] of 192 lower bytes [191:0] of the EXT_CSD register. The USER_WP field may be reset to "0" after power-on or hardware reset.

Figure 5:
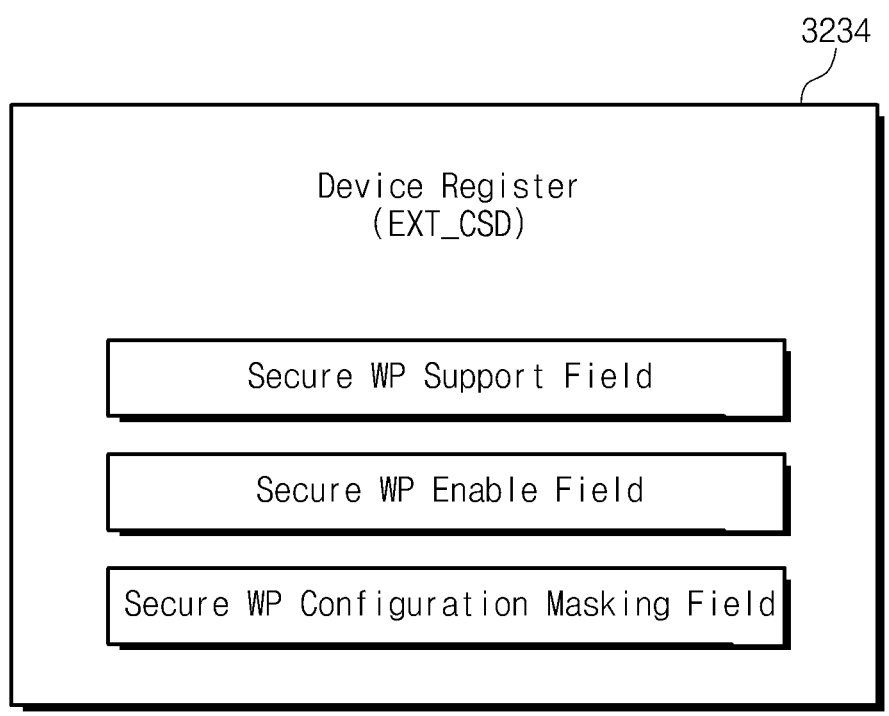
FIG. 5 is a block diagram schematically illustrating a field of an EXT_CSD register associated with write protect of a device register illustrated in FIG. 3.

FIG. 5 is a block diagram schematically illustrating a field of an EXT_CSD register associated with write protect of a device register illustrated in FIG. 3. Referring to FIG. 5, a device register 3234 of a storage system 3000 according to at least one example embodiment of the inventive concepts may include a secure WP support field, a secure WP enable field, and a secure WP configuration masking field, the device register 3234 may be an EXT_CSD register.

The secure WP support field may be a field for identifying whether a storage device 3200 (refer to FIG. 3) supports a secure WP function. That is, a host 3100 (refer to FIG. 3) may read the secure WP support field to determine whether the storage device 3200 supports secure write protect. The secure WP support field may be assigned to one or more of lower bytes of a modes segment of an EXT_CSD register.

For example, the secure WP support field may be placed at an address [172] of 192 lower bytes [191:0] of the EXT_CSD register 3234. It is assumed that the secure WP support field is formed of one byte Bit7 to Bit0. Under this assumption, a WP function may be supported when a specific bit is set with "1", and it may not be supported when the specific bit is set with "0".

The secure WP enable field may be a field for activating secure WP of the storage device 3200. The host 3100 may set the secure WP enable field through HMAC authentication. Once the secure WP enable field is activated, the storage device 3200 may continue to operate in a secure WP mode. The secure WP enable field may not be set when, for example, a user or manufacturer of the host 3100 does not want the host 3100 to support a secure WP operation.

The secure WP enable field may be assigned to one or more of lower bytes of the modes segment of the EXT_CSD mode. The secure WP enable field may be placed at an address (e.g., [174]) of 192 lower bytes [191:0] of the EXT_CSD register 3234. It is assumed that the secure WP enable field is formed of one byte (i.e., 8 bits) including Bit7 to Bit0. Under this assumption, a WP function may be supported when a specific bit is set with "1", and it may not be supported when the specific bit is set with "0".

The secure WP configuration masking field may be a field for controlling all register fields associated with secure WP. If the secure WP enable field is set, all register fields associated with write protect may be controlled by a relevant marking field. According to at least one example embodiment of the inventive concepts, the secure WP configuration masking field may be accessed only through the HMAC authentication. Alternatively, according to at least one example embodiment of the inventive concepts, the secure WP configuration masking field may be accessed through other ways instead of, or in addition to, the HMAC authentication. The secure WP configuration masking field may be placed on at least one address of the EXT_CSD register.

It is assumed that the secure WP configuration masking field is formed of one byte Bit7 to Bit0. Under this assumption, a secure WP configuration field may be accessible when a first bit (a specific bit) is set with "1", and the secure WP configuration field may be inaccessible when a second bit (other specific bit) is set with "0".

Figure 6:
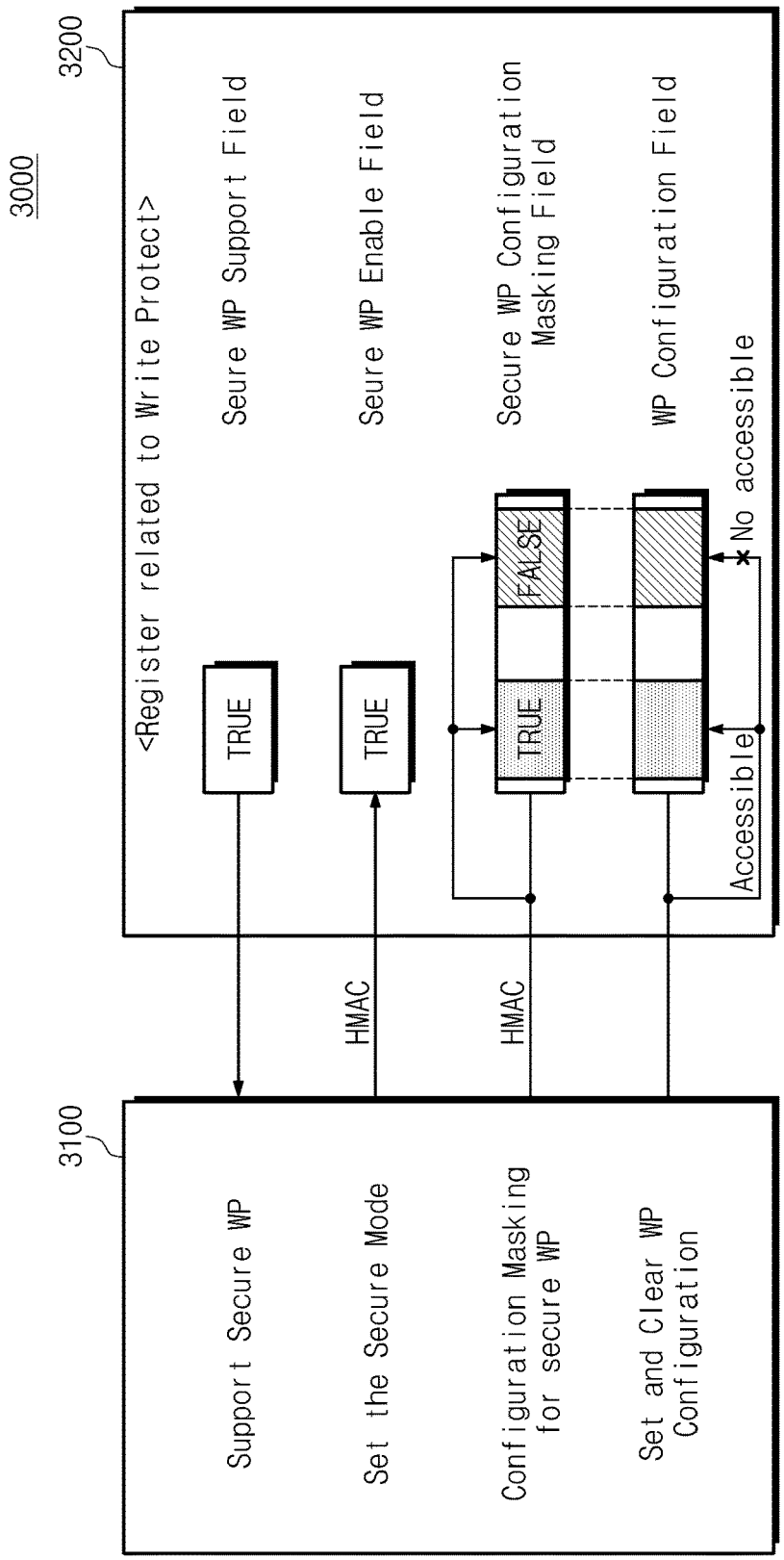
FIG. 6 is a block diagram schematically illustrating a secure WP attribute controlling method of a storage system illustrated in FIG. 3.

FIG. 6 is a block diagram schematically illustrating a secure WP attribute controlling method of a storage system illustrated in FIG. 3. A storage system 3000 may add a field for supporting secure write protect to a register (e.g., an EXT_CSD register) for controlling a secure WP attribute and may define a request and a response for setting and clearing secure WP.

Referring to FIG. 6, a storage device 3200 may include registers associated with write protect. As described above, the registers associated with write protect may include a secure WP support field, a secure WP enable field, a secure WP configuration masking field, and an existing WP configuration field. In FIG. 6 a register value may be denoted by "TRUE" when associated with secure WP and may be denoted by "FALSE" when not associated with the secure WP.

A host 3100 may read a secure WP support field of the storage device 3200 to determine whether the storage device 3200 supports a secure WP function. In the example illustrated in FIG. 6, the host 3100 may read the value "TRUE" from a secure write support field and determine that the storage device 3200 does support the secure WP function.

The host 3100 may set a secure mode through HMAC authentication. The host 3100 may set the secure mode may using the secure WP enable field. The secure mode may be maintained (i.e., the secure WP function may be enabled) once the secure WP enable field is set with the value "TRUE". According to at least one example embodiment, if the secure WP enable field is not set (i.e., because the host 3100 does not set the secure WP enable field) the secure WP function will not be enabled.

A storage system 3000 may allow a certified host 3100 with a private key to set or clear WP through a secure mode set using the HMAC authentication, thereby granting rights for changing data of a relevant area. That is, the storage system 3000 according to at least one example embodiment of the inventive concepts may manage a conventional WP feature of the storage device 3200 through a secure mode set using authentication, thereby making it possible to maintain the conventional WP feature. Also, at least one example embodiment of the inventive concepts may perform an improved manner of write protect using authentication, according to selection of a user.

The storage system 3000 according to at least one example embodiment of the inventive concepts may employ known WP function attributes used with conventional mobile devices (e.g., permanent, power-on, and temporary). Additionally, at least one example embodiment of the inventive concepts may activate a secure WP configuration masking field aligned to a register field, which contains a configuration or a conventional write protect function, through setting of a secure mode.

Referring to FIG. 6, a register field that is aligned to a masking field set with the value "TRUE" may be accessible, and a register field that is aligned to a masking field set with the value "FALSE" may be inaccessible. Alternatively, the storage system 3000 according to at least one example embodiment of the inventive concepts may make it possible to mask a plurality of fields using mask bits the number of which is less than the number of fields to be controlled, according to an implementation manner. For example, according to at least one example embodiment, access to all register fields may be controlled using a single mask bit.

According to at least one example embodiment of the inventive concepts, there is a validation process for determining whether a normal command operation for setting or clearing WP using a value of the secure WP configuration masking field is valid. Like the above-described secure mode setting, a value of the secure WP configuration masking field may be decided by a host 3100 certified using HMAC. At least one example embodiment of the inventive concepts may maintain compatibility with a conventional mobile product and may allow a host 3100, certified using HMAC authentication, to have access rights with respect to a register field associated with setting or clearing WP, thereby protecting security data safely.

Meanwhile, the storage system 3000 according to at least one example embodiment of the inventive concepts may add a request and a response for setting or clearing secure WP. For this, it may be desirable to control the above-described register field values through HMAC authentication.

FIG. 7 is a table schematically illustrating a data frame including information regarding requests and responses for setting and clearing secure WP. Referring to FIG. 7, a data frame including information regarding requests and responses may include fields for Stuff, Key/MAC, Data, Nonce (e.g., a cryptographic nonce), Write Counter (W.C.), Address, Block Count, Result, and Request/Response Type.

According to at least some example embodiments of the inventive concepts, the request/response type field (illustrated with the identifier Req/Resp in FIG. 7) may have a 2-byte length, a request may be sent from a host 3100 to a storage device 3200, and a response may be transferred from the storage device 3200 to the host 3100. The authentication key or MAC (Message Authentication Code) may have a 32-byte length. A request may have a key or an MAC and a response may have the MAC. The write counter may have a 4-byte length and may be a total of count value of successful authenticated data write requests that the host 3100 produces.

Figure 8:
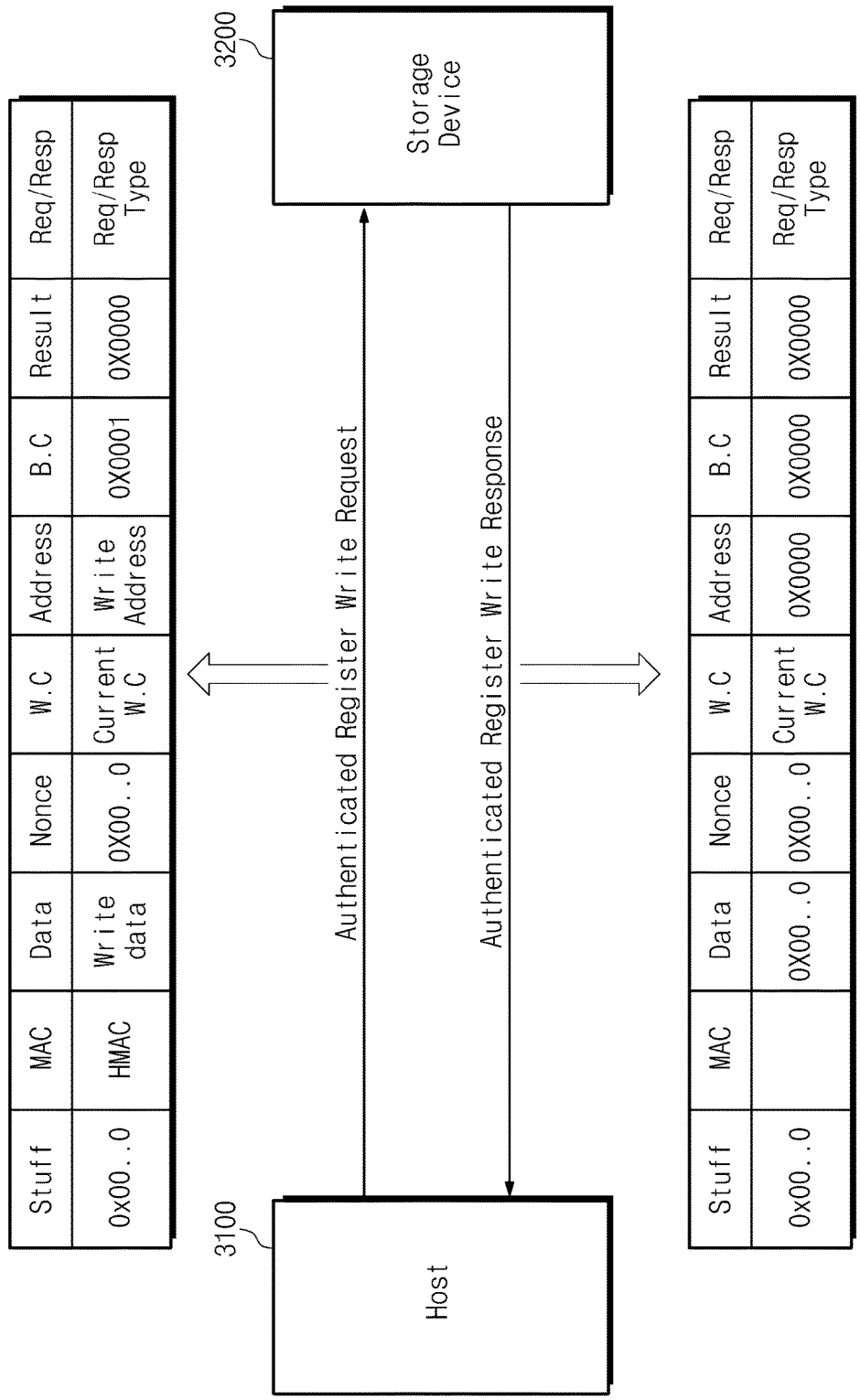
FIG. 8 is a block diagram schematically illustrating a write request and a write response for an authenticated register.

FIG. 8 is a block diagram schematically illustrating an authenticated register write request and authenticated register write response. Referring to FIG. 8, an authenticated register write request may be provided from a host 3100 to a storage device 3200. In the authenticated register write request, the MAC field may include an HMAC value. The Data field may include an actual data value of a register field to be set. The address field may include an offset value of a register field to be accessed. The request/response type field (Req/Resp) may include a authenticated register write request.

An authenticated register write response may be provided from the storage device 3200 to the host 3100. In the authenticated register write response, the data and an address fields may be set with "0", respectively. A request/response type field may be set with a value indicating a authenticated register read request.

Figure 9:
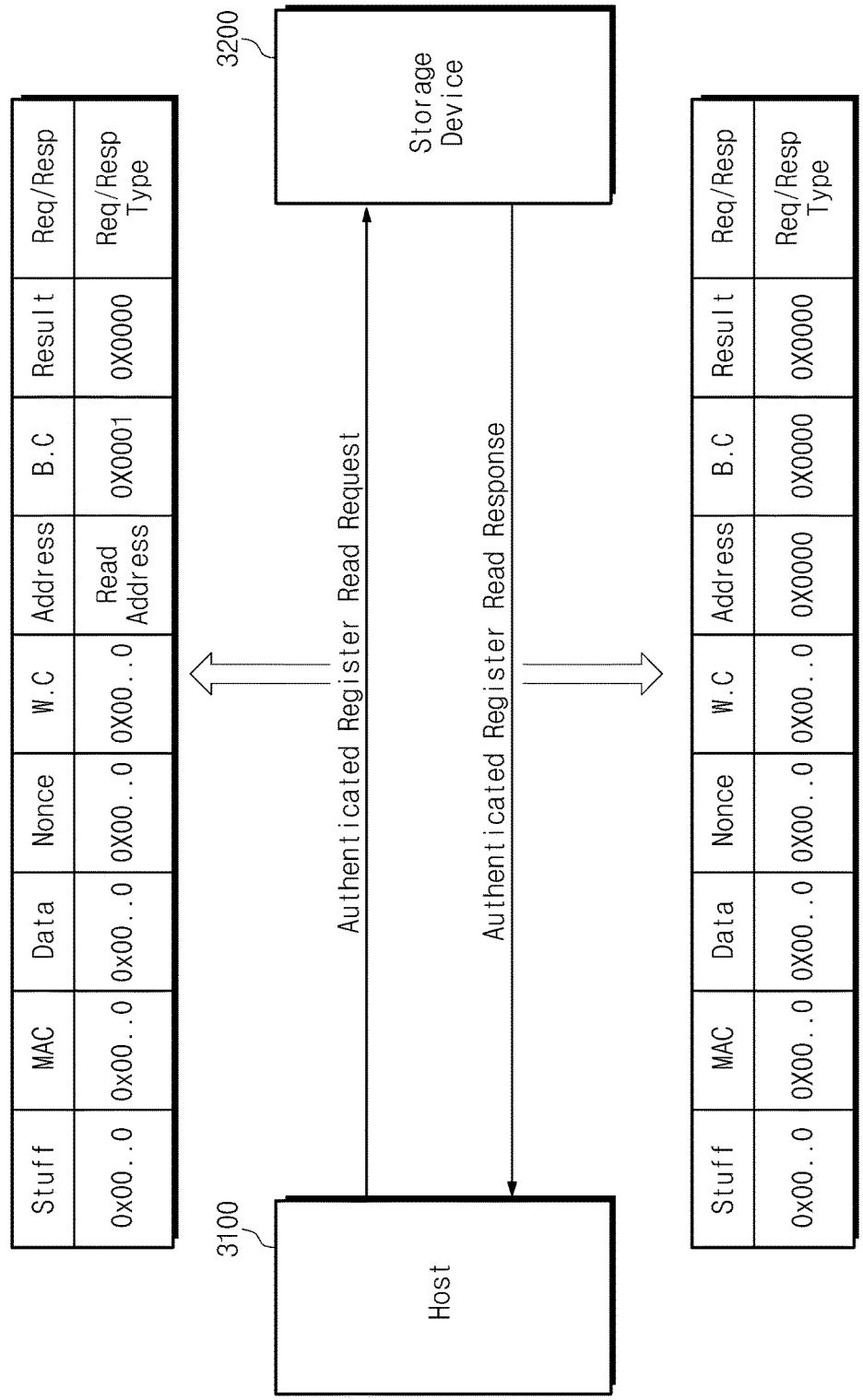
FIG. 9 is a block diagram schematically illustrating a read request and a read response for an authenticated register.

FIG. 9 is a block diagram schematically illustrating an authenticated register read request and authenticated register read response. Referring to FIG. 9, an authenticated register read request may be sent from a host 3100 to a storage device 3200, and a response to the read request may be provided from the storage device 3200 to the host 3100. In an authenticated register read request and authenticated register read response, the data field may be set to the value "0". In the read request, an address field may be set with an offset value of a register field to be accessed, and the read response field (Req./Resp) may be set to "0". A request/response type may be set with the authenticated register read request and authenticated register read response.

Figure 10:
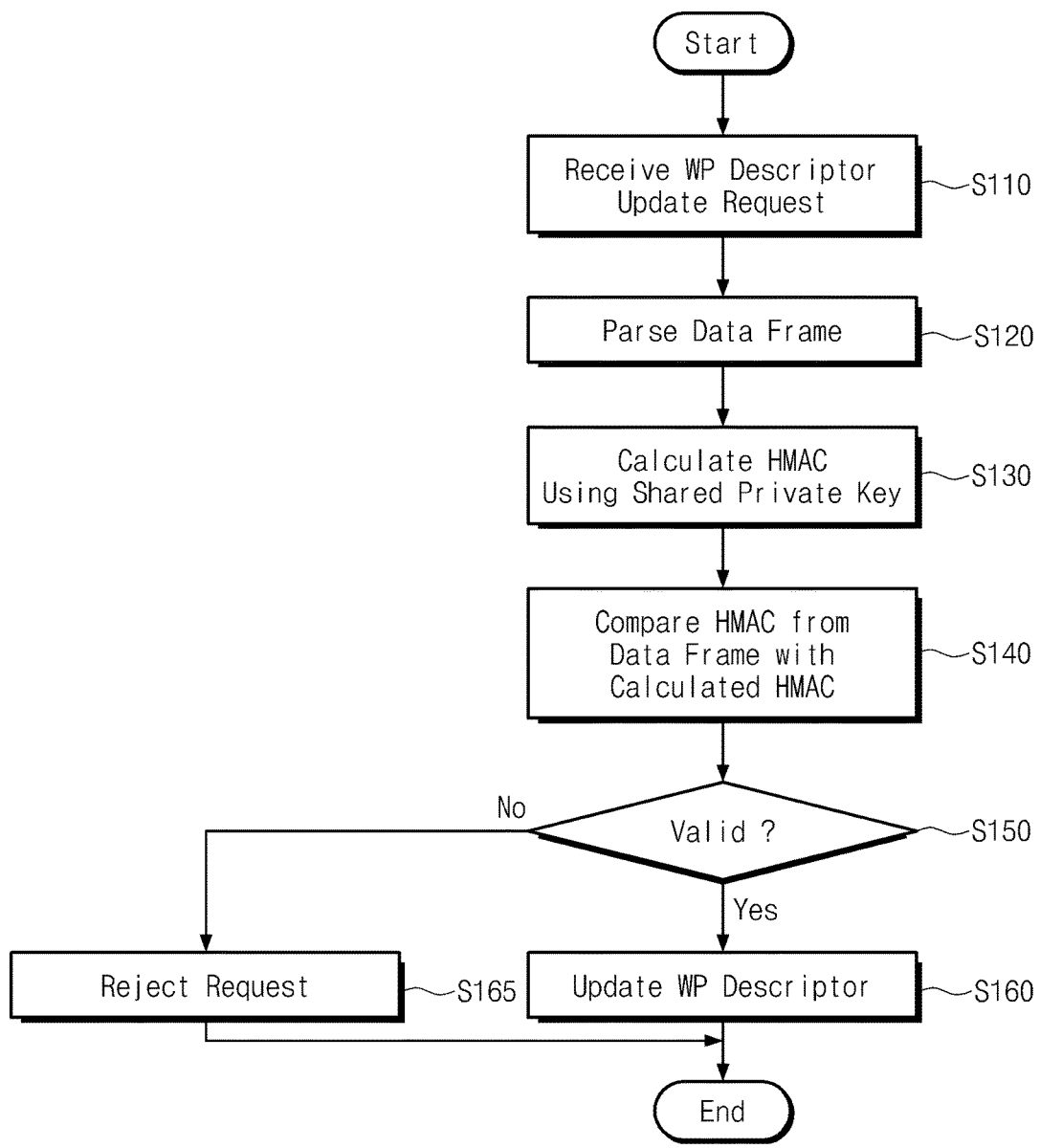
FIG. 10 is a flow chart schematically illustrating an keyed-hash message authentication Code (HMAC) authentication method of a storage system illustrated in FIG. 3.

FIG. 10 is a flow chart schematically illustrating an HMAC authentication method of a storage system illustrated in FIG. 3. For example, FIG. 10 illustrates a method where a storage device 3200 authenticates setting of a secure mode (e.g., enabling a WP function).

In step S110, a command manager 3232 of the storage device 3200 may receive a request regarding a secure mode (e.g., a WP descriptor update request) from a host 3100. The storage device 3200 may set the secure mode in response to the request. That is, the storage device 3200 may newly configure a secure mode to be used.

In step S120, the command manager 3232 may parse a data frame of the request regarding the secure mode. In step S130, a security manager 3234 of the storage device 3200 may calculate a HMAC using a shared private key. The security manager 3234 may compute the HMAC using the private key and a message. The security manager 3234 may compute the HMAC using, for example, at least one of MD5, SHA1, SHA256, etc.

In step S140, the security manager 3234 may compare the HMAC obtained from the data frame of the request regarding the secure mode received in step S110 and the HMAC computed in step S130. As illustrated in FIG. 8, a data frame of an authenticated register write request provided from the host 3100 may include an HMAC. The security manager 3234 may authenticate the request regarding the secure mode by comparing the HMAC provided from the host 3100 and the HMAC computed by the storage device 3200.

In step S150, the security manager 3234 may determine whether the request regarding the secure mode is valid, based on a comparison result of step S140. When the HMAC provided from the host 3100 and the HMAC computed by the storage device 3200 are equal to each other, the security manager 3234 may determine the request regarding the secure mode as being valid. When the HMAC provided from the host 3100 and the HMAC computed by the storage device 3200 are not equal to each other, the security manager 3234 may reject the request regarding the secure mode.

When the request about the secure mode is determined (e.g., by the security manager 3234) to be valid, in step S160, the security manager 3234 may set a secure mode according to the request about the secure mode. For example, if the request regarding the secure mode is a request to update a WP descriptor, the security manager may allow the performance of an operation to update the WP descriptor in step S160. When the request regarding the secure mode is determined to be invalid (e.g., by the security manager 3234), in step S165, the security manager 3234 may reject the request about the secure mode.

Figure 11:
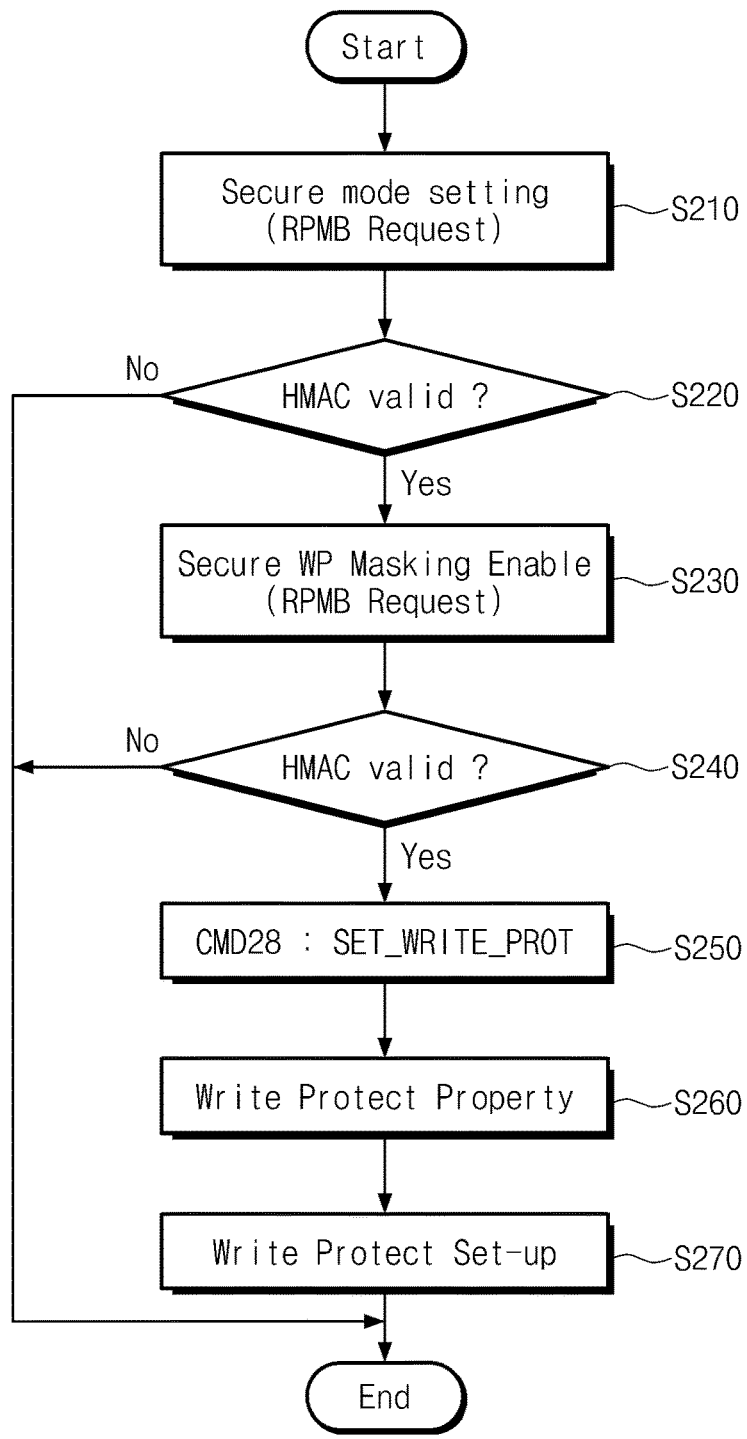
FIG. 11 is a flow chart for describing a method for setting write protect when a storage system according to at least one example embodiment of the inventive concepts is applied to an embedded MultiMediaCard (eMMC)

FIG. 11 is a flow chart for describing a method for setting WP when a storage system according to at least one example embodiment of the inventive concepts is applied to an eMMC.

In step S210, a host 3100 may set a secure mode through a replay protected memory block (RPMB) request. That is, the host 3100 may read a secure WP support field to determine whether a storage device 3200 supports a secure WP function or not. The host 3100 may set the secure mode according to the determination result. The storage device 3200 may set the secure mode because the secure WP enable field is included in an EXT_CSD register.

In step S220, HMAC authentication may be performed. The secure mode in step S210 may be executed through HMAC authentication. The HMAC authentication may be performed as described with reference to FIG. 10. The request may be rejected when HMAC authentication indicates the request is not valid. When HMAC authentication indicates the request is valid, the method proceeds to step S230.

In step S230, the host 3100 may enable secure WP masking through the RPMB request. The storage device 3200 may enable a masking field because a secure WP configuration masking field is included in the EXT_CSD register.

In step S240, HMAC authentication may be carried out. Whether to enable the secure WP masking in step S230 may be determined through the HMAC authentication in step S240. WP may be set using a conventional command (e.g., CMD 28) if a WP set enable value of the secure WP configuration masking field is set.

In step S250, the host 3100 may use command, CMD 28: SET_WRITE_PROT to set WP for a portion of the storage device 3200 identified by an address (or addresses) indicated by the command CMD 28. If the storage device 3200 has WP features, the CMD 28 may set a WP bit of the addressed group. WP properties may be coded into device specific data.

In step S260, the WP property may be checked. For example, a user area WP register of an EXT_CSD register may be checked. The user area WP register may be placed at an address [171] of the EXT_CSD register and may be a USER_WP field. The host 3100 may decide WP attributes (e.g., permanent, power-on, and temporary) according to the USER_WP field of EXT_CSD[171].

In step S270, write protect may be set. The storage device 3200 may be write-protected using the WP property set in the EXT_CSD register.

The storage system according to at least one example embodiment of the inventive concepts may add a secure mode and a secure WP configuration masking field to the EXT_CSD register. Such fields may be inaccessible using CMD 6 (SWITCH) and may be writable through authentication using RPMB. After a secure mode bit is set through the HMAC authentication, the ability to set the write protect using CMD 28 is restricted and it is no longer possible for a host to set the write protect using CMD 28 without successfully completing the HMAC authentication. For example, according to at least one example embodiment, the WP may be set using CMD 28 only if a WP set enable value of the secure WP configuration masking field is set through the HMAC authentication.

To change a manner, in which the host 3100 directly controls the storage device 3200, into an authentication based manner, the storage system 3000 according to at least one example embodiment of the inventive concepts may add a register for a mode change and a masking field accessed only through the authentication based manner. According to at least one example embodiment of the inventive concepts, it is possible to maintain a conventional control manner or use an authentication above, according to selection of a user. According to at least some example embodiments of the inventive concepts, in case of an eMMC, it is possible to implement secure WP using RPMB.

Meanwhile, the storage system 3000 according to at least one example embodiment of the inventive concepts may make a power management integrated circuit (PMIC)-based security attack less likely or, alternatively, impossible through an automatic power-on recovery. Also, at least one example embodiment of the inventive concepts may manage all WP associated features by adding a secure mode to a conventional mobile product. After entering the secure mode, all configurations about write protect may be changed through a WP configuration masking field.

Figure 12:
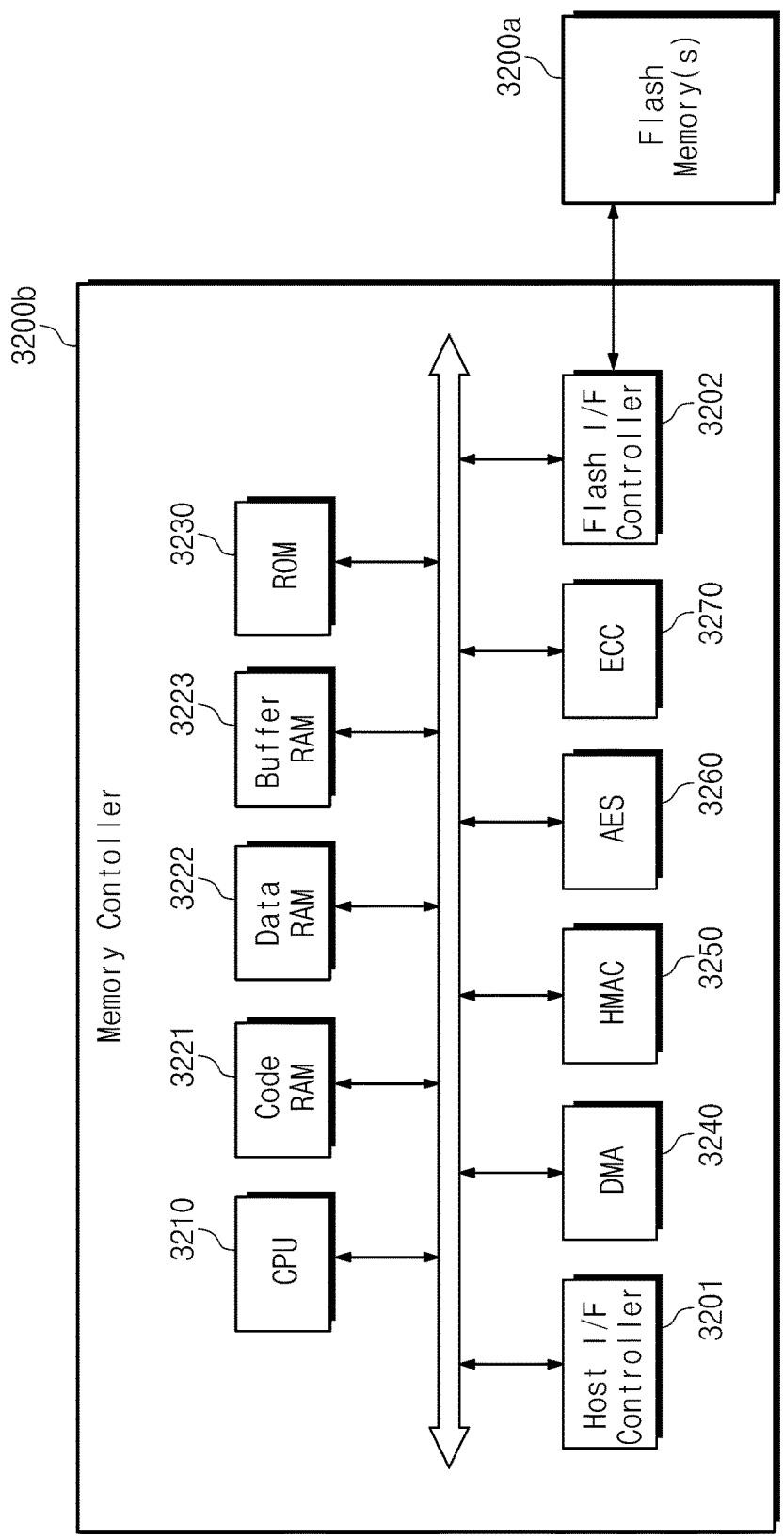
FIG. 12 is a block diagram schematically illustrating a hardware configuration of a flash memory based storage system shown in FIG. 3.
Figure 13:
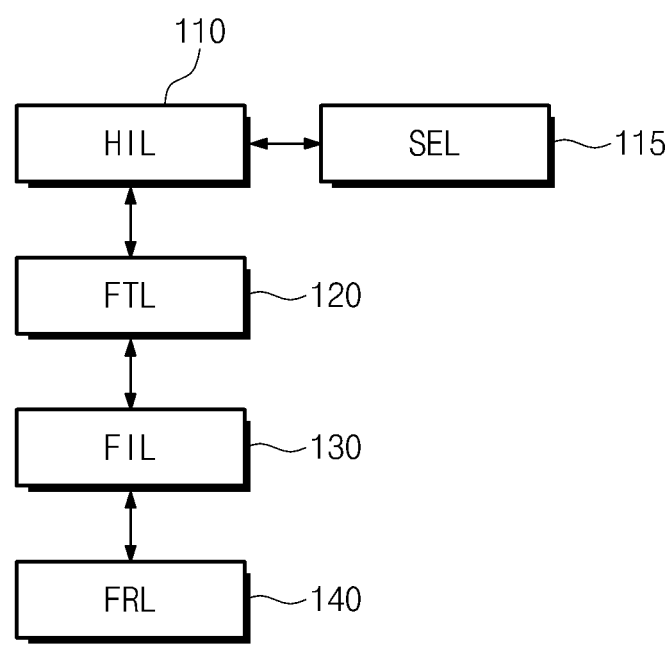
FIG. 13 is a block diagram schematically illustrating a software layer structure.

FIG. 12 is a block diagram schematically illustrating a hardware configuration of a flash memory based storage system shown in FIG. 3. FIG. 13 is a block diagram schematically illustrating a software layer structure.

Referring to FIG. 12, a storage device 3200 may contain a flash memory 3200a and a memory controller 3200b. The memory controller 3200b may be connected to a host through a host interface controller 3201 and to the flash memory 3200a through a flash interface controller 3202. The memory controller 3200b may contain a central processing unit (CPU) 3210, a code RAM 3221, a data RAM 3222, a buffer RAM 3223, and a ROM 3230.

The CPU 3210 may control an overall operation of the memory controller 3200b. For example, at booting, the CPU 3210 may load a boot code stored at the flash memory 3200a or the ROM 3230 onto the code RAM 3221 to control the booting of the storage device 3200.

As illustrated in FIG. 12, the memory controller 3200b may further include a Direct Memory Access (DMA) 3240 for accessing a memory directly, an HMAC unit 3250 and an Advanced Encryption Standard (AES) unit 3260 for data security, and an error-correcting code (ECC) unit 3270 for correcting an error of data. The HMAC unit 3250, AES unit 3260, and ECC unit 3270 may be implemented by one or more circuits or implemented as software or firmware executed by a processor including, for example, the CPU 3210.

Referring to FIG. 13, a software layer structure of the storage device 3200 may include a host interface layer (HIL) 110, a security layer (SEL) 115, a flash translation layer (FTL) 120, a flash interface layer (FIL) 130, and a flash recovery layer (FRL) 140.

Based on the host interface layer (HIL) 110, the CPU 3210 may control operations of receiving data from a host through the host interface controller 3201 and storing the received data at the data RAM 3221. When exchanging data with the host, the CPU 3210 may use the security layer (SEL) 115 to authenticate a host command and to set a write protect area. A security manager 3234 shown in FIG. 3 may be software that is run on the security layer (SEL) 115.

Based on the flash interface layer (FIL) 130, the CPU 3210 may provide data stored at the data RAM 3222 or the buffer RAM 3223 to the flash memory 3200a through the flash interface controller 3202. The CPU 3210 may manage address mapping of the flash memory 3200a, depending on the flash translation layer (FTL) 120. The CPU 3210 may manage a recovery operation of the flash memory 3200*a*, depending on the flash recovery layer (FRL) 140.

The storage device 3200 according to at least one example embodiment of the inventive concepts may determine whether a normal command for setting or clearing write protect is valid, based on a value of a secure write protect configuration marking filed. Like setting of a secure mode, a value of the secure write protect configuration marking filed may be decided by a certified host 3100 using HMAC. At least one example embodiment of the inventive concepts may maintain compatibility with a conventional mobile product and may allow a host, certified through HMAC authentication, to have access rights about a register field associated with setting and clearing of write protect, thereby protecting secure data safely.

Meanwhile, a storage system according to at least one example embodiment of the inventive concepts is applicable to a variety of products. The storage system according to an embodiment of at least one example embodiment of the inventive concepts may be implemented in electronic devices, such as a personal computer, a digital camera, a camcorder, a handheld telephone, an MP3 player, a Portable Media Player (PMP), a PlayStation Player (PSP), and a Personal Digital Assistant (PDA). A storage medium of the storage system may be implemented with storage devices, such as a memory card, a USB memory, and a Solid State Drive (SSD).

Figure 14:
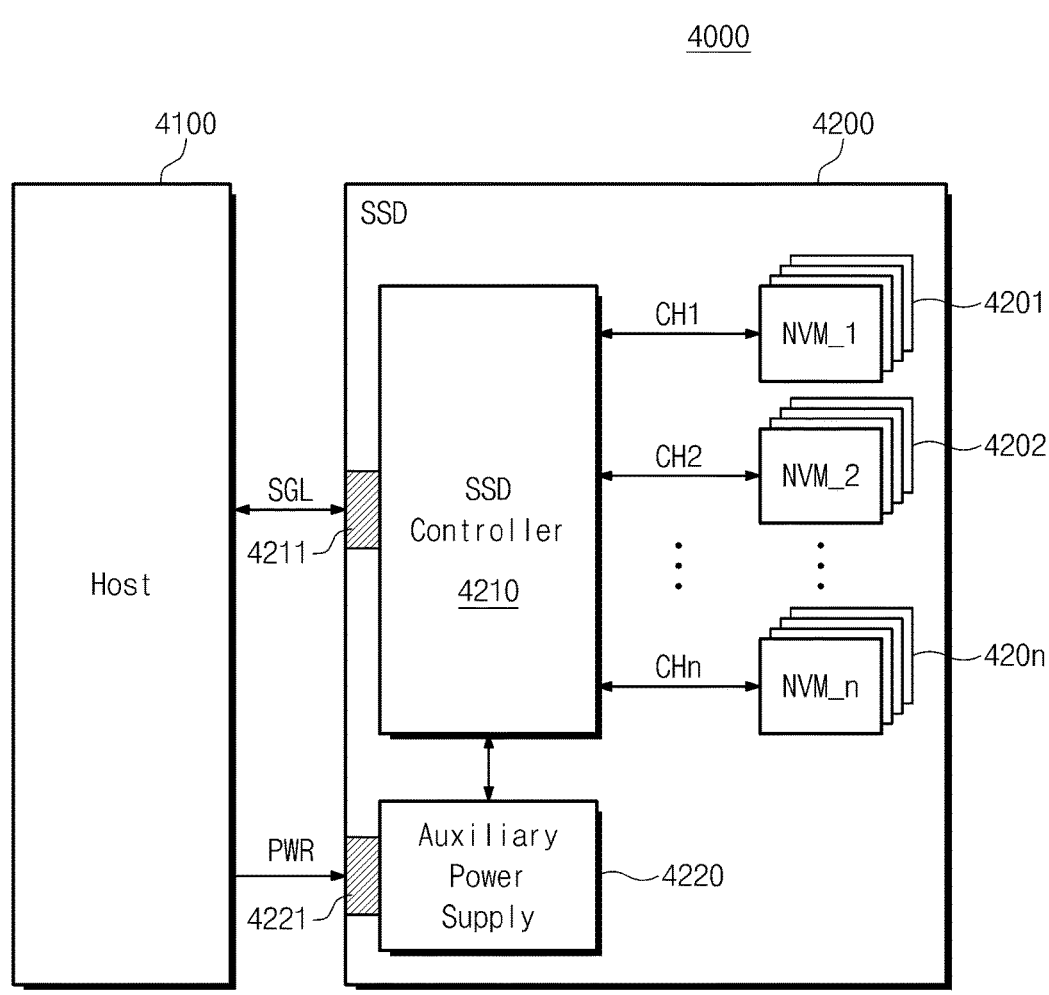
FIG. 14 is a block diagram illustrating a solid state drive to which a storage device according to at least one example embodiment of the inventive concepts is applied.

FIG. 14 is a block diagram illustrating a solid state drive to which a storage device according to at least one example embodiment of the inventive concepts is applied. Referring to FIG. 14, a solid state drive (SSD) system 4000 may include a host 4100 and an SSD 4200. According to at least one example embodiment of the inventive concepts, According to at least one example embodiment of the inventive concepts, the host 4100 may be an example implementation of the host 1100, 2100 or 3100 discussed above, and the storage device 4200 may be an example implementation of the storage device 1200, 2200, or 3200 discussed above.

The SSD 4200 may exchange signals SGL with the host 4100 through a signal connector 4211 and may be supplied with a power through a power connector 4221. The SSD 4200 may include a plurality of flash memories 4201 through 420*n*, an SSD controller 4210, and an auxiliary power supply 4220.

The plurality of flash memories 4201 through 420*n* may be used as a storage medium of the SSD 4200. Not only may the SSD 4200 employ the flash memory, but it may employ nonvolatile memory devices, such as PRAM, MRAM, ReRAM, and FRAM. The flash memories 4201 through 420*n* may be connected with the SSD controller 4210 through a plurality of channels CH1 through CHn. One channel may be connected with one or more flash memories. Flash memories connected with one channel may be connected with the same data bus.

The SSD controller 4210 may exchange signals SGL with the host 4100 through the signal connector 4211. The signals SGL may include the following: a command, an address, and data. The SSD controller 4210 may be configured to write or read out data to or from a corresponding flash memory in response to a command of the host 4100. The SSD controller 4210 will be more fully described with reference to FIG. 15.

The auxiliary power supply 4220 may be connected with the host 4100 through the power connector 4221. The auxiliary power supply 4220 may be charged by a power PWR from the host 4100. The auxiliary power supply 4220 may be placed inside or outside the SSD 4200. For example, the auxiliary power supply 4220 may be put on a main board to supply an auxiliary power to the SSD 4200.

Figure 15:
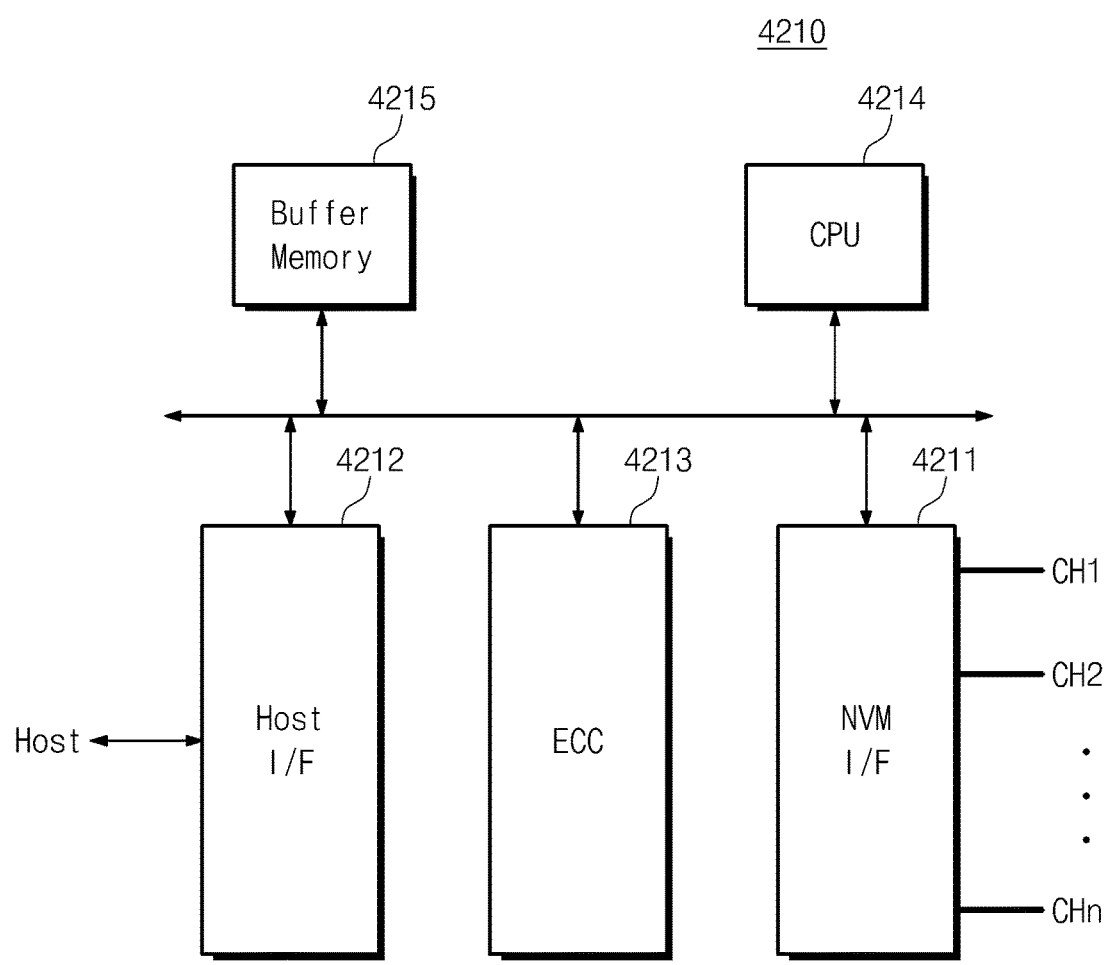
FIG. 15 is a block diagram schematically illustrating an SSD controller shown in FIG. 14.

FIG. 15 is a block diagram schematically illustrating an SSD controller shown in FIG. 14. Referring to FIG. 15, an SSD controller 4210 may include an NVM interface 4211, a host interface 4212, an ECC circuit 4213, a central processing unit (CPU) 4214, and a buffer memory 4215.

The NVM interface 4211 may scatter data transferred from the buffer memory 4215 into channels CH1 through CHn. The NVM interface 4211 may transmit data read from flash memories 4201 through 420*n* to the buffer memory 4215. The NVM interface 4211 may use a flash memory interface manner, for example. That is, the SSD controller 4210 may perform a read, a write, and an erase operation in the flash memory interface manner.

The host interface 4212 may provide an interface with an SSD 4200 in compliance with the protocol of the host 4100. The host interface 4212 may communicate with the host 4100 by means of USB (Universal Serial Bus), SCSI (Small Computer System Interface), PCI express, ATA, PATA (Parallel ATA), SATA (Serial ATA), SAS (Serial Attached SCSI), and so on. The host interface 4212 may also perform disk emulation which enables the host 4100 to recognize the SSD 4200 as a hard disk drive (HDD).

The ECC circuit 4213 may generate an error correction code ECC by means of data transferred to the flash memory 4201 through 420*n*. The error correction code ECC thus generated may be stored at spare areas of the flash memory 4201 through 420*n*. The ECC circuit 4213 may detect an error of data read from the flash memory 4201 through 420*n*. If the detected error is correctable, the ECC circuit 4213 may correct the detected error.

The CPU 4214 may analyze and process signals received from a host 4100 (refer to FIG. 14). The CPU 4214 may control the host 4100 through the host interface 4212 or the flash memories 4201 through 420*n* through the NVM interface 4211. The CPU 4214 may control the flash memories 4201 through 420*n* by means of firmware for driving an SSD 4200.

The buffer memory 4215 may temporarily store write data provided from the host 4100 or data read from a flash memory. Also, the buffer memory 4215 may store metadata to be stored in the flash memories 4201 through 420*n* or cache data. At sudden power-off, the metadata or cache data stored at the buffer memory 4215 may be stored in the flash memories 4201 through 420*n*. The buffer memory 4215 may be implemented with a DRAM, an SRAM, etc.

Figure 16:
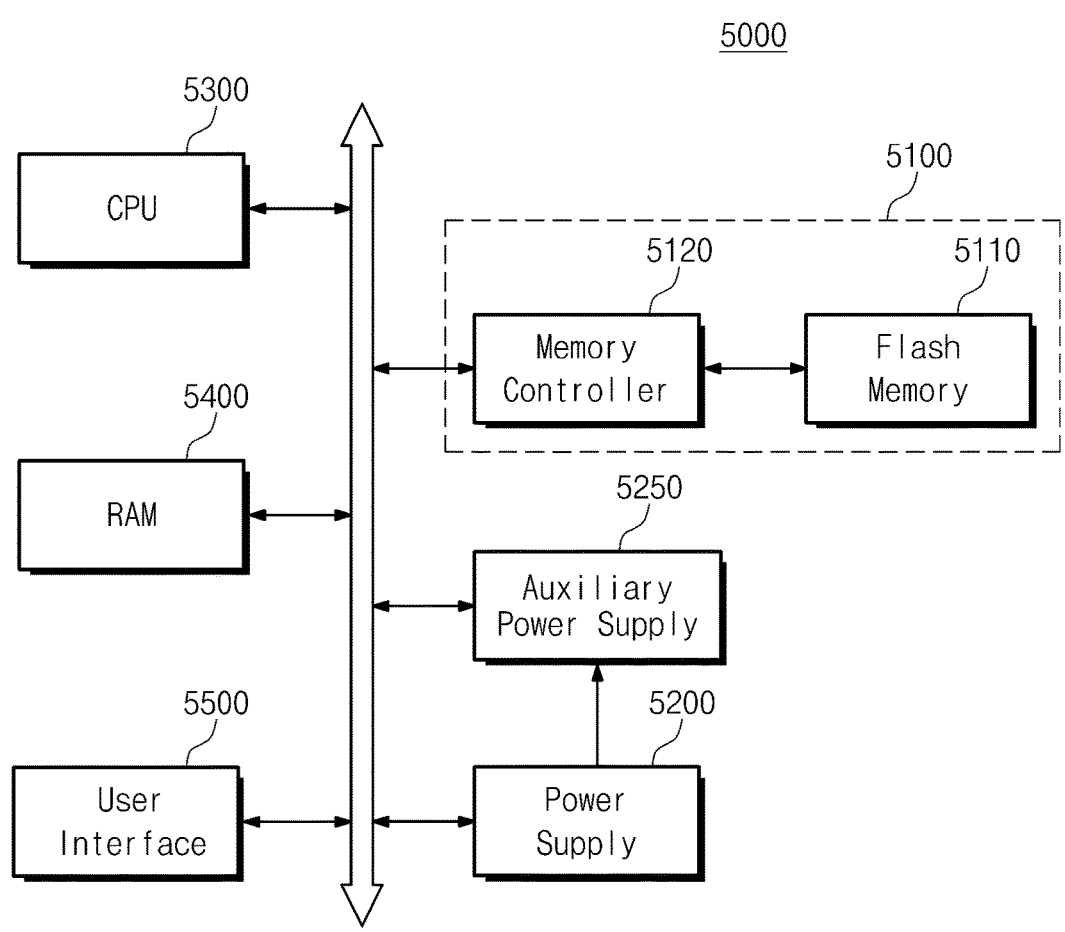
FIG. 16 is a block diagram schematically illustrating an electronic device including a storage device according to at least one example embodiment of the inventive concepts.

FIG. 16 is a block diagram schematically illustrating an electronic device including a storage device according to at least one example embodiment of the inventive concepts. An electronic device 5000 may be implemented with a personal computer or with handheld electronic devices, such as a notebook computer, a cellular phone, a PDA, and a camera.

Referring to FIG. 16, the electronic device 5000 may include a memory system 5100, a power supply 5200, an auxiliary power supply 5250, a central processing unit (CPU) 5300, a Random Access Memory (RAM) 5400, and a user interface 5500. The memory system 5100 may contain a flash memory 5110 and a memory controller 5120. According to at least one example embodiment of the inventive concepts, the memory system 5100 may be an example implementation of the storage device 1200, 2200, or 3200 discussed above.

Figure 17:
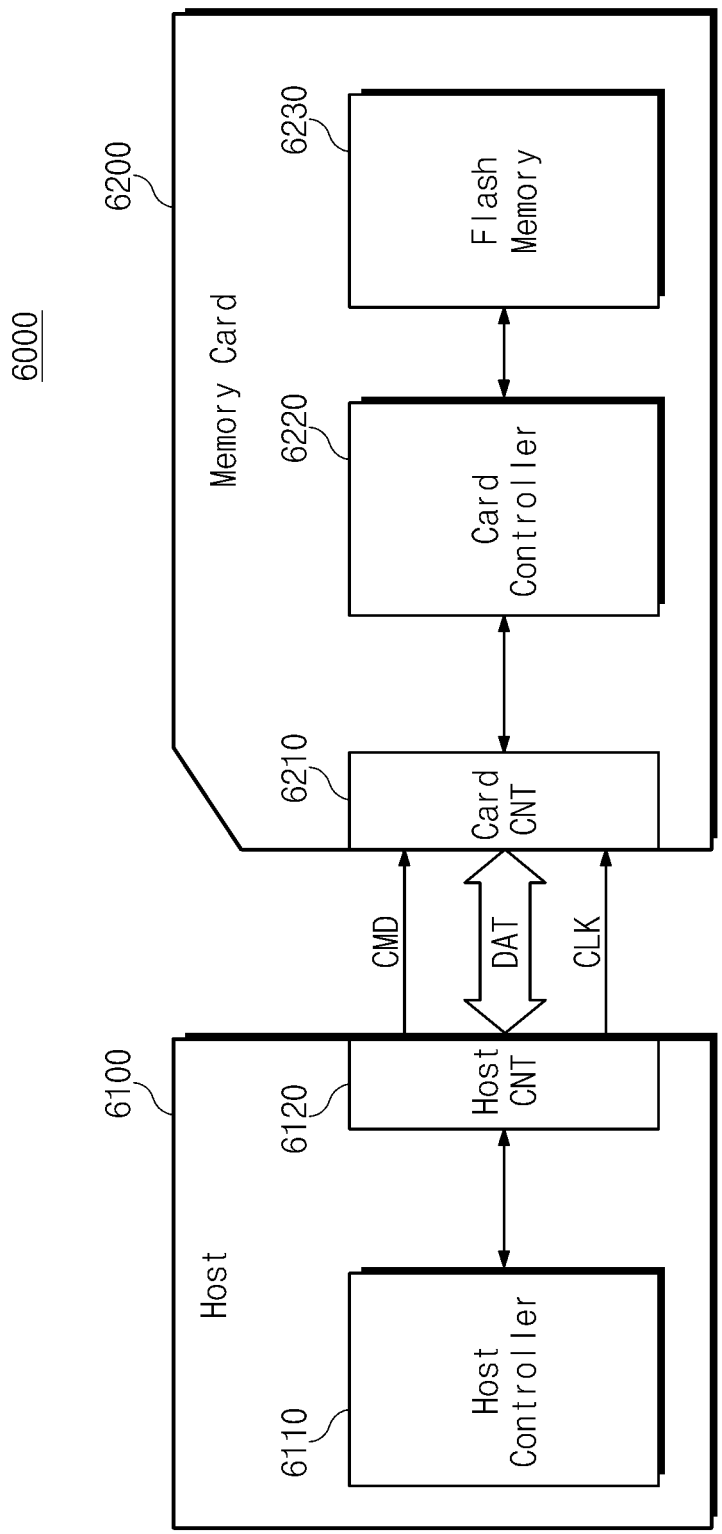
FIG. 17 is a block diagram schematically illustrating a memory card to which a storage device of a user device according to at least one example embodiment of the inventive concepts is applied.

FIG. 17 is a block diagram schematically illustrating a memory card to which a storage device of a user device according to at least one example embodiment of the inventive concepts is applied. A memory card system 6000 may include a host 6100 and a memory card 6200. The host 6100 may contain a host controller 6110 and a host connection unit 6120. The memory card 6200 may include a card connection unit 6210, a card controller 6220, and a flash memory 6230. According to at least one example embodiment of the inventive concepts, the host 6100 may be an example implementation of the host 1100, 2100 or 3100 discussed above, and the storage device 6200 may be an example implementation of the storage device 1200, 2200, or 3200 discussed above.

The host 6100 may write data at the memory card 6200 and may read data from the memory card 6200. The host controller 6110 may provide the memory card 6200 with a command (e.g., a write command), a clock signal CLK generated from a clock generator (not shown) in the host 6100, and data through the host connection unit 6120.

The card controller 6220 may store data at the flash memory 6230 in response to a command input through the card connection unit 6210. The data may be stored in synchronization with a clock signal generated from a clock generator (not shown) in the card controller 6220. The flash memory 6230 may store data transferred from the host 6100. For example, if the host 6100 is a digital camera, the memory card 6200 may store image data.

According to at least some example embodiments of the inventive concepts, a manner for setting and clearing write protect using a conventional normal command may be used without modification to maintain compatibility with a conventional manner, whereas at least one example embodiment of the inventive concepts may support a function where only a certificated host has write protect rights with respect to a storage device in setting a secure mode, thereby improving a write protect function through an authentication procedure and solving a problem related to compatibility with a conventional mobile product.

According to at least one example an embodiment of the inventive concepts, a three dimensional (3D) memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The term "monolithic" means that layers of each level of the array are directly deposited on the layers of each underlying level of the array.

According to at least one example embodiment of the inventive concepts, the 3D memory array includes vertical NAND strings that are vertically oriented such that at least one memory cell is located over another memory cell. The at least one memory cell may comprise a charge trap layer. Each vertical NAND string may include at least one select transistor located over memory cells, the at least one select transistor having the same structure with the memory cells and being formed monolithically together with the memory cells.

The following patent documents, which are hereby incorporated by reference, describe suitable configurations for three-dimensional memory arrays, in which the three-dimensional memory array is configured as a plurality of levels, with word lines and/or bit lines shared between levels: U.S. Pat. Nos. 7,679,133; 8,553,466; 8,654,587; 8,559,235; and US Pat. Pub. No. 2011/0233648.

At least some example embodiments of the inventive concepts are not limited to a flash memory device. For example, at least some example embodiments of the inventive concepts may be applied to any or all storage devices that translate addresses using a translation layer.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A storage system comprising:
   a host; and
   a storage device,
   the host configured to provide a request for setting or clearing write protection (WP) of the storage device; and
   the storage device including a register, the register including fields that store information for controlling attributes of the WP and information for controlling a secure mode of the storage device, the register including a secure WP support field configured to indicate whether or not the storage device supports the secure mode and a secure WP enable field configured to control a state of the secure mode of the storage device,
   wherein, before the secure mode is set, the host can set the WP without being authenticated,
   wherein, after the host reads the secure WP support field and determines that the storage device supports the secure mode, the host is configured to set the secure mode by setting the secure WP enable field through authentication using at least one keyed-hash message authentication code (HMAC,
   wherein after the secure mode is set, the storage device restricts an access of and unauthenticated host for setting and clearing the WP, and
   wherein the register further comprises a secure WP configuration masking field for controlling register fields of the register that are associated with the WP, and the register fields are aligned to secure WP configuration masking field and are accessed depending on register values of the secure WP configuration masking field.

2. The storage system of claim 1, wherein the storage device is configured such that a number of the register fields controlled by the secure WP configuration masking field is greater than a number of bits included in the WP configuration masking field.

3. The storage system of claim 1, wherein the storage system is configured such that storage device requires requests of the host to be authenticated using at least one of HMAC, SHA256, or MD5 before the storage device allows the host to access the secure WP configuration masking field.

4. The storage system of claim 1, wherein the storage system is configured such that storage device requires requests of the host to set or clear the secure mode to be authenticated using at least one of HMAC, SHA256, or MD5 before the storage device allows the host to set or clear the secure mode.

5. The storage system of claim 4, wherein the host is configured such that the request of the host to set or clear the secure mode is provided using a data frame that includes a request/response type field, a write counter field, a nonce field, a block counter field, a data field, an address field, a result field, and an HMAC field.

6. The storage system of claim 1, wherein the storage device is an embedded MultiMediaCard (eMMC) and is configured to implement the secure mode using a replay protected memory block (RPMP).

7. The storage system of claim 1, wherein the storage device includes at least one of a plurality of flash memory devices, the plurality of flash memory devices each including a three-dimensional memory array.

8. A storage system comprising:
a host; and
a storage device,
the storage device being configured to implement a write protection (WP) mode such that, when the WP mode is in an enabled state, the storage device prevents data stored in the storage device from being changed until the WP mode is in a disabled state,
the storage device being configured to receive a WP change request, the WP change request being a request to change a state of the WP mode,
the host being configured to read a secure WP support field of the storage device, the secure WP support field configured to indicate whether or not the storage device supports a secure mode,
the storage device being configured to implement a secure mode such that,
the secure mode is in an disabled state when a secure WP enable field of the storage device is not set,
the secure mode is in an enabled state when, after the host reads the secure WP support field and determines that the storage device supports the secure mode, the secure WP enable field of the storage device is set by the host through authentication using a keyed-hash message authentication code (HMAC),
when the secure mode is in the disabled state, the storage device changes the state of the WP mode in response to the WP change request, and
when the secure mode is in an enabled state, the storage device performs an authentication process on the WP change request based on the HMAC included in the WP change request, and the storage device does not change the state of the WP mode in response to the WP change request only unless the authentication process indicates that the WP change request is valid.

9. The storage system of claim 8,
the host being configured to generate the WP change request such that the WP change request include the HMAC, and to send the WP change request to the storage device,
the storage device being configured such that, when the secure mode is enabled, the storage device performs the authentication process on the WP change request based on the HMAC.

10. The storage system of claim 9,
wherein the host is configured to generate an authentication code using a shared private key of which is stored at the storage device.

11. The storage system of claim 10,
wherein the storage device is configured such that performing the authentication process includes,
generating a validation code using the shared private key,
performing a comparison operation based on the validation code and the authentication code, and
determining whether the WP change request is valid based on a result of the comparison operation.

12. The storage system of claim 11, wherein the host is configured such that the authentication code is the HMAC), and the storage device is configured such that the validation code is the HMAC.

13. A storage system comprising:
a host configured to provide a request for setting or clearing write protection (WP); and
a storage device configured to receive the request of the host,
wherein the storage device comprises a register and the register comprises register fields that store information for controlling attributes of the WP,
the register further comprising:
a secure WP support field configured to indicate whether or not the storage device supports a secure mode,
a secure WP enable field configured to control a state of the secure mode of the storage device, and
a secure WP configuration masking field configured to control the register fields that are associated with the WP, the register fields being aligned to the secure WP configuration masking field and being accessed depending on register values of the secure WP configuration masking field,
and
wherein, after the host reads the secure WP support field and determines that the storage device supports the secure mode, the host is further configured to set the secure mode by setting the secure WP enable field through authentication using a keyed-hash message authentication code (HMAC), and
wherein the storage device is further configured to:
set or clear the secure mode based on the request of the host when the storage device authenticates the request of the host, and
restrict an access of an unauthenticated host after the secure mode is set.

14. The storage system of claim 13, wherein the storage device is further configured such that a number of the register fields controlled by the secure WP configuration masking field is greater that a number of bits included in the secure WP configuration masking field.

15. The storage system of claim 13, wherein the host is further configured to access the secure WP configuration masking field through authentication using the HMAC.

16. The storage system of claim 13, wherein the host is further configured to control the register fields through authentication using the HMAC.

17. The storage system of claim 13, the request of the host is provided using a data frame that includes a request/response type field, a write counter field, a nonce field, a block counter field, a data field, an address field, a result field, and an HMAC field.

18. The storage system of claim 13, wherein the storage device is an embedded MultiMediaCard (eMMC) and is further configured to implement the secure WP using a replay protected memory block (RPMP).

* * * * *